United States Patent Office 3,573,931
Patented Apr. 6, 1971

3,573,931
PREPARING DRIED CHEESE
Robert F. Dale, Brookfield, Wis., assignor to Universal
 Foods Corporation, Milwaukee, Wis.
No Drawing. Filed Mar. 8, 1968, Ser. No. 711,517
Int. Cl. A23c 19/00
U.S. Cl. 99—115    15 Claims

ABSTRACT OF THE DISCLOSURE

A process for preparing dried cheese which comprises extruding a high moisture content cheese, with a ram type extruder, into elongated noodle form having a diameter of up to 3/32 inch, drying the extruded noodle at elevated temperatures of up to about 115° F. to a moisture content up to about 17%. Cheeses which contain up to about 53% fat are adapted for processing by the method of this invention to produce a storage stable product which does not require refrigeration.

BACKGROUND OF THE INVENTION

Field of the invention

The invention relates to a process for preparing dried cheese and especially dried cheeses of high fat content, which dried cheese can be stored without refrigeration and added to commercial food products which are subsequently packaged, frozen or the like. The product is free flowing when comminuted and is adapted for use in automatic dispensing equipment.

Description of the prior art

No successful process has been developed in the prior art to prepare a dried cheese for commercial or home use which is subsequently rehydrated by cooking or when incorporated into a moist food product. Ordinarily cheese and products incorporating cheese require refrigeration to preserve texture, flavor and odor, as well as to prevent spoilage. When cheese is used in the manufacture of commercial products, i.e. a cheese topping, such as in a pizza, it does not lend itself readily to use in automatic dispensing machines, since the freshly grated product tends to block in the hopper or agglomerate, hence, preventing easy, accurate measurement of quantities to be applied to or mixed into the food product being manufactured.

Some spray dried cheese products have been prepared by admixing cheese with skim milk, phosphates and the like, followed by spray drying. This, while successful, is not a pure cheese product. Furthermore, spray drying results in the loss of volatiles which in turn results in a loss of the characteristic flavor and taste of the cheese product.

Freeze drying of cheese produces a satisfactory product but it is so expensive as to be prohibitive in commercial practice.

SUMMARY OF THE INVENTION

In one broad form the present invention is a process for preparing a dried cheese which has a low moisture content and is stable in storage without deterioration at room temperatures for extended periods of time. The process involves extruding the cheese with a ram type extuder into noodle form having a diameter of up to about 3/32 inch, drying the noodle in a forced air oven at temperatures up to 115° F., preferably up to 110° F. to a moisture content of up to about 17%.

If desired the noodle, after drying, can be comminuted to a granular or powder form, which is suitable for use in automatic dispensing machines. The dried cheese produced by this process is stable in storage for extended periods at ordinary temperatures without refrigeration. Moistureproof containers are ordinarily required to limit moisture pick-up from the atmosphere. When placed in contact with water or liquids containing water at the time of use, the dried cheese rehydrates and results in a full flavor and aroma product. The process is especially adapted for use with a high fat cheese, such as blue (or blue vein) cheeses and mozzarella. The optimum moisture content of the final dried cheese varies somewhat depending on the fat content of the cheese and the type. An excessively dry cheese, i.e., below 3%, results in a product which is difficult to rehydrate.

DESCRIPTION OF THE PREFERRED EMBODIMENTS

The cheeses which may advantageously be processed by the methods of this invention include blue or blue vein cheeses, such as Gorgonzola or Roquefort. These cheeses are produced by innoculation of a culture of the organism *Penicillium roquefortii*. Other cheeses of the lower fat content varities, which may be dried in accordance with the present invention, include mozzarella, cottage cheese, creamed cottage cheeses and ricotta (a cottage cheese type).

The Federal standards of identity for these cheese products are as follows:

| | Federal standards | | |
|---|---|---|---|
| | Minimum aging | Maximum moisture, percent | Minimum FDB,[1] percent |
| Blue cheese | 60 days | 46 | 50 |
| Gorgonzola | 90 days | 42 | 50 |
| Mozzarella, low moisture | No standard. | 45-52 | 45 |
| Mozzarella, low moisture, part skim | No standard. | 45-52 | 30-45 |
| Ricotta [2] | 10-15 days | 60 | 0-25 |
| Cottage cheese | No standard. | 80 | No standard |
| Cottage cheese, creamed | No standard. | 80 | 4 |

[1] FDB=fat, dry basis.
[2] There are no Federal standards. The standards shown are customary manufacturing standards.

Of the general types of cheeses noted above, the present invention is preferably concerned with those cheeses which contain some fat—particularly those which contain from 48 to about 53% fat for blue cheeses and from 30 to 42% for mozzarella. "Fat content" as the term is used herein, refers to a determination made by the Babcock Method. It has been found that controlled conditions for drying are necessary to produce a product in which there is no separation of fat or surface exudation of fat on the cheese product being dried. Since this is a characteristic of high fat cheeses, the drying of such high fat cheeses is a preferred aspect of this invention.

The extrusion of the cheese into noodle form is accomplished by means of conventional ram type extruders (i.e. utilizing a positive piston) equipped with an extruder plate having orifice diameters of up to about 3/32 inch, preferably from 1/32 to 2/32 inch. The extrusion is preferably carried out at a temperature of from 40 to 72° F., since weeping (exudation of serum and/or fat) is a characteristic of excessive extrusion temperatures.

The drying is carried out in a forced air drier in which the extruded noodle is spread out in a porous bed on trays or endless wire mesh belts and passed through the drier. The air flow should pass freely through the porous bed of noodles. In a preferred aspect the direction of the current of forced air is reversed at intervals during the drying process. The temperatures used are from 80° F. up to 115° F., preferably up to 110° F. and most preferably from 95 to 110° F. The time will vary up to about 8 hours, preferably from 2 to 6 hours, and most preferably 2½ to 3½ hours. The temperature, and time of drying depend somewhat on the fat content and/or texture of the cheese. The temperature and rate of drying must be such as to prevent fat exudation, browning or overdrying of the product. Mozzarella cheese is preferably dried to a moisture content of from 3 to 17%, most preferably from 7 to 17%. In the case of blue cheeses, cottage cheeses and ricotta, the cheese is preferably dried to a moisture content of from 3 to 12%, most preferably from 3 to 7.5%. The moisture contents are those values obtained by the toluene distillation method.

The following specific examples will illustrate the process of the present invention.

EXAMPLE 1

A blue cheese having a fat content of 52% was broken up into chunks and fed into the hopper of a piston or ram type extruder (8 inches in diameter) equipped with an orifice plate having 2/32 inch orifices. The temperature of the cheese during the extrusion was 60° F. The noodle formed by the extruder was arranged into a bed about 1⅓ inches deep, on the perforated trays of a forced air drier, and dried at a temperature of 110° F. for 3¼ hours. During drying the direction of air flow through the bed was recovered at forty minute intervals. The product had a final moisture content of 5.3%. The product was stored at room temperature (at 70° F.) for six weeks in polyethylene lined cartons. At the end of this storage time the product showed no signs of appreciable deterioration. When the dried cheese was formulated into a salad dressing, it achieved full flavor and texture.

EXAMPLE 2

A mozarella cheese having a fat content of 41% was extruded as in Example 1, and dried at 100° F. for 4½ hours to a final moisture content of 12%. The dried cheese was stored in polyethylene lined cartons at room temperature (70° F.) for four weeks. No signs of deterioration were observed. When placed on a pizza that was subsequently baked, the mozzarella cheese rehydrated well and had full flavor and texture.

EXAMPLE 3

Bakers' cottage cheese containing no fat, at a moisture content of 75% was extruded as in Example 1, and dried 3½ hours at 110° F. to a moisture content of 8.6%. Air flow was reversed as in Example 1. The dried product was ground to a fine powder and stored in a polyethylene lined carton at room temperature for three weeks. At the end of this time rehydration of the dried product with warm water essentially restored the original texture and taste.

While several particular embodiments of the invention have been illustrated in the foregoing, it will be appreciated that other embodiments may be provided which do not depart from the true spirit and scope of this invention and such embodiments are intended to be included herein.

I claim:
1. A process for preparing a dried cheese that is storage stable without refrigeration which comprises:
   (a) extruding high moisture cheese selected from the group consisting of blue cheeses, mozzarella and cottage cheeses, using a ram type extruder, into a thin noodle form having a diameter up to 3/32 inch, and
   (b) drying the noodle in a forced air dried at a temperature of up to 115° F. to a moisture content of up to 17% over a period of up to 8 hours.

2. A process for preparing a dried cheese product that is storage stable without refrigeration which comprises:
   (a) extruding a high moisture cheese selected from the group consisting of blue cheeses, mozzarella and cottage cheeses, using a ram type extruder, in noodle form, having a diameter of up to about 3/32 inch, and
   (b) drying the noodle in a porous bed in a forced air drier to permit free circulation of air around and through the noodles at a temperature of up to 115° F. for a period of up to 8 hours, to a final moisture content of up to about 17% but not less than about 3%.

2. A process according to claim 2 wherein the noodle diameter is from 1/32 to 3/32 inch.

4. A process according to claim 2 wherein the temperature of drying is from 95 to 110° F.

5. A process according to claim 2 wherein the initial fat content of the cheese is up to about 53%.

6. A process according to claim 2 wherein the fat content of the cheese is from 30 to 53%.

7. A process according to claim 2 wherein the cheese is dried to a final moisture content of from 3 to 12%.

8. A process according to claim 2 wherein the cheese is dried to a final moisture content of from 3 to 7.5%.

9. A process according to claim 2 wherein the cheese is dried for a period of from 2 to 6 hours.

10. A process for preparing a dried cheese which is storage stable without refrigeration which comprises:
    (a) extruding a cheese selected from the group consisting of blue cheese having a fat content of from 48 to 53%, and mozzarella having a fat content of 30 to 42%, using a ram type extruder, in noodle form, having diameters of from 1/32 to 3/32 inch,
    (b) forming the extruded noodle into a porous bed and drying the noodle in a forced air environment at a temperature of from 95 to 110° F. for a period of from 2 to 6 hours to a final moisture content of up to 17%.

11. A process according to claim 10 wherein the extrusion is carried out at temperatures of from about 40 to 72° F.

12. A process according to claim 10 wherein the cheese is mozzarella and the final moisture content is from 7 to 17%.

13. A process according to claim 10 wherein the cheese is selected from the group consisting of blue cheese, cottage, and ricotta, and the final moisture content is from 3 to 12%.

14. A process according to claim 13 where the final moisture content is from 3 to 7.5%.

15. A process according to claim 10 wherein the direction of the forced air flow through the porous bed is reversed at intervals during the drying process.

References Cited

UNITED STATES PATENTS

| | | | |
|---|---|---|---|
| 1,492,388 | 4/1924 | Poppet | 99—115 |
| 1,997,866 | 4/1935 | Irvin | 99—115 |
| 3,448,010 | 6/1969 | Pomper et al. | 99—96X |

OTHER REFERENCES

Kosikowski, K.: Cheese and Fermented Milk Foods, Edward Brothers, Inc., Ann Arbor, Mich., 1966 (p. 5).

LIONEL M. SHAPIRO, Primary Examiner

D. M. NAFF, Assistant Examiner

UNITED STATES PATENT OFFICE
CERTIFICATE OF CORRECTION

Patent No. 3,573,931                    Dated APRIL 6, 1971

Inventor(s) ROBERT F. DALE

It is certified that error appears in the above-identified patent and that said Letters Patent are hereby corrected as shown below:

Col. 2, 1. 41, "varities" should be --varieties--

Col. 3, 1. 51, "recovered" should be --reversed--

Col. 3, 1. 61, "mozarella" should be --mozzerella--

Col. 4, 1. 20, (Claim 1), "dried" should be --drier--

Col. 4, 1. 36, The second "Claim 2" should be numbered --Claim 3--

Col. 4, 1. 71, (Claim 13), "cheese" should be --cheeses--

In the References

Col. 5, 1. 5, "Poppet" should be --Popper--

Col. 6, 1. 3, "Edward" should be --Edwards--

Signed and sealed this 19th day of October 1971.

(SEAL)
Attest:

EDWARD M. FLETCHER, JR.             ROBERT GOTTSCHALK
Attesting Officer                   Acting Commissioner of Paten